US008168727B2

(12) United States Patent
Kinoshita et al.

(10) Patent No.: US 8,168,727 B2
(45) Date of Patent: May 1, 2012

(54) POLYESTER RESIN, PRODUCTION PROCESS THEREFOR, AND BIAXIALLY ORIENTED POLYESTER FILM COMPRISING THE POLYESTER RESIN

(75) Inventors: Eiji Kinoshita, Gifu (JP); Mitsuo Tojo, Gifu (JP)

(73) Assignee: Teijin Limited, Osaka-shi (JP)

( * ) Notice: Subject to any disclaimer, the term of this patent is extended or adjusted under 35 U.S.C. 154(b) by 12 days.

(21) Appl. No.: 12/863,303

(22) PCT Filed: Jan. 15, 2009

(86) PCT No.: PCT/JP2009/050903
§ 371 (c)(1),
(2), (4) Date: Jul. 16, 2010

(87) PCT Pub. No.: WO2009/091072
PCT Pub. Date: Jul. 23, 2009

(65) Prior Publication Data
US 2011/0060108 A1 Mar. 10, 2011

(30) Foreign Application Priority Data
Jan. 18, 2008 (JP) ................................. 2008-009227

(51) Int. Cl.
*C08G 63/00* (2006.01)
*C08G 64/00* (2006.01)
(52) U.S. Cl. ........ 525/437; 428/402; 428/405; 528/193; 528/194; 528/196; 528/198; 528/271; 528/272
(58) Field of Classification Search .................. 428/402, 428/405; 528/193, 194, 196, 198, 271, 272
See application file for complete search history.

(56) References Cited

U.S. PATENT DOCUMENTS
4,581,438 A 4/1986 Inata et al.
2010/0120967 A1 5/2010 Kinoshita et al.

FOREIGN PATENT DOCUMENTS

| JP | 60-135428 A | 7/1985 |
|---|---|---|
| JP | 60-221420 A | 11/1985 |
| JP | 61-143425 A | 7/1986 |
| JP | 61-145724 A | 7/1986 |
| JP | 61-238824 A | 10/1986 |
| JP | 61-246229 A | 11/1986 |
| JP | 2-191638 A | 7/1990 |
| JP | 6-145323 A | 5/1994 |
| JP | 2008-255288 A | 10/2008 |
| JP | 2008-260877 A | 10/2008 |
| JP | 2008-303244 A | 12/2008 |
| JP | 2009-007444 A | 1/2009 |
| JP | 2009-013215 A | 1/2009 |
| WO | 2008-096612 A1 | 8/2008 |
| WO | 20081096612 A1 | 8/2008 |

OTHER PUBLICATIONS

International Search Report of PCT/JP2009/050903, Mailing Date of Apr. 28, 2009.
Notification of Transmittal of Translation of the International Preliminary Report on Patentability, including Forms PCT/IB/338, PCT/IB/373, and PCT/ISA/237, of International Application No. PCT/JP2009/050903 mailed Sep. 10, 2010.

*Primary Examiner* — Terressa Boykin
(74) *Attorney, Agent, or Firm* — Westerman, Hattori, Daniels & Adrian, LLP

(57) ABSTRACT

A polyester resin having excellent dimensional stability against environmental changes and excellent dimensional stability in the processing step while having excellent moldability and a biaxially oriented polyester film comprising the same. The polyester resin comprises a recurring unit represented by the following formula (A) and a recurring unit represented by the following formula (B) as the main constituents:

—O—C(O)—R$^1$—C(O)—O—R$^2$—O—      (A)

—O—C(O)—R$^3$—C(O)—O—R$^2$—O—      (B)

(R' is a phenylene group or naphthalenediyl group, R$^2$ is an alkylene group having 2 to 4 carbon atoms or cyclohexylene group, and R$^3$ is 6,6'-(alkylenedioxy)di-2-naphthoic acid), wherein the content of the recurring unit (B) is not less than 5 mol % and less than 50 mol %, and the ratio of adjacent recurring units (A) and (B) is less than 0.9 based on a value obtained by doubling the product of the content of the recurring unit (A) and the content of the recurring unit (B).

13 Claims, No Drawings

POLYESTER RESIN, PRODUCTION PROCESS THEREFOR, AND BIAXIALLY ORIENTED POLYESTER FILM COMPRISING THE POLYESTER RESIN

TECHNICAL FIELD

The present invention relates to a polyester resin obtained by copolymerizing 6,6'-(alkylenedioxy)di-2-naphthoic acid, a production process therefor, and a biaxially oriented polyester film comprising the polyester resin.

BACKGROUND ART

Since aromatic polyesters typified by polyethylene terephthalate and polyethylene-2,6-naphthalate have excellent mechanical properties, dimensional stability and heat resistance, they are widely used in films. Especially polyethylene-2,6-naphthalate has more excellent mechanical properties, dimensional stability and heat resistance than polyethylene terephthalate and is therefore used in application fields in which the requirements for these properties are very high, for example, base films for high-density magnetic recording media. However, the requirement for dimensional stability is becoming higher and higher in high-density magnetic recording media, and the further improvement of this property is desired.

Patent Documents 1 to 4 propose a polyalkylene-6,6'-(alkylenedioxy)di-2-naphthoate obtained from a diethyl-6,6'-(alkylenedioxy)di-2-naphthoate which is an ester compound of 6,6'-(alkylenedioxy)di-2-naphthoic acid. According to these documents, a crystalline polyethylene-6,6'-(ethylenedioxy)di-2-naphthoate having a melting point of 294° C. is presented.

However, since the polyalkylene-6,6'-(alkylenedioxy)di-2-naphthoate presented by these patent documents has a very high melting point and very high crystallinity, it has the following problems: when it is to be formed into a film, its extrusion becomes nonuniform due to low fluidity in a molten state, and when it is to be stretched after it is extruded, its crystallization proceeds and it is broken by stretching at a high draw ratio.

Patent Document 3 teaches that a magnetic recording flexible disk having a small tracking shift is obtained by setting the maximum temperature expansion coefficient of a film comprising polyethylene-6,6'-(ethylenedioxy)di-2-naphthoate to 10 to 35 (ppm/° C.), the maximum humidity expansion coefficient of the film to 0 to 8 (ppm/% RH), the difference between the maximum and minimum temperature expansion coefficients to 0 to 6.0 (ppm/° C.) and the difference between the maximum and minimum humidity expansion coefficients to 0 to 4.0 (pm/% RH).

However, the requirement for the improvement of recording density in magnetic recording media is now very high and, accordingly, dimensional stability required for the base film cannot be attained not only with polyethylene terephthalate but also with polyethylene-2,6-naphthalate and a film presented by Patent Document 3.

(Patent Document 1) JP-A 60-135428
(Patent Document 2) JP-A 60-221420
(Patent Document 3) JP-A 61-145724
(Patent Document 4) JP-A 6-145323

DISCLOSURE OF THE INVENTION

It is an object of the present invention to provide a polyester resin having excellent moldability and dimensional stability against environmental changes and excellent dimensional stability in the processing step and a biaxially oriented polyester film comprising the polyester resin.

In the biaxially oriented polyester film, both the humidity expansion coefficient and the temperature expansion coefficient have close relationship with the Young's modulus. As the Young's modulus becomes higher, these expansion coefficients become lower. However, the Young's modulus cannot be increased infinitely and has its limits from the viewpoints of film formability and the acquisition of a Young's modulus in an orthogonal direction. Therefore, even when the Young's modulus is almost the same, a film having a low temperature expansion coefficient and a low humidity expansion coefficient is desired. Since a film comprising the above polyalkylene-6,6'-(alkylenedioxy)di-2-naphthoate has a low humidity expansion coefficient though its Young's modulus is low, it is considered as a preferred film which meets the above requirement.

However, referring to the above Patent Documents 1 to 4, though a film comprising a polyalkylene-6,6'-(alkylenedioxy)di-2-naphthoate can have a very high Young's modulus in one direction, its Young's modulus in a direction orthogonal to the above direction is extremely low. Further, it has another problem that its temperature expansion coefficient is very high though its humidity expansion coefficient is very low.

The inventors of the present invention found that, when an aromatic dicarboxylic acid component such as naphthalenedicarboxylic acid and a 6,6'-(alkylenedioxy)di-2-naphthoic acid component are copolymerized, a film having excellent properties of both the aromatic dicarboxylic acid and the polyalkylene-6,6'-(alkylenedioxy)di-2-naphthoic acid can be obtained and filed a patent application for this invention.

This polyester resin comprising the 6,6'-(alkylenedioxy) di-2-naphthoic acid component as a comonomer has excellent properties and is a useful resin. However, it was found that, in the production of a magnetic recording medium having a film comprising this resin as a base film, when tension is applied to the film at a high temperature in the step of applying a coating composition for forming a magnetic layer and drying it, the base film elongates, thereby making it impossible to form a uniform magnetic layer. This problem does not occur in a film comprising polyethylene-2,6-naphthalene dicarboxylate.

Then, the inventors of the present invention conducted intensive studies on the elongation of the film and found that the elongation can be suppressed by controlling the ratio of a recurring unit derived from the 6,6'-(alkylenedioxy)di-2-naphthoic acid component and another recurring unit adjacent to the above recurring unit. The present invention was accomplished based on this finding.

Thus, according to the present invention, there is provided a polyester resin comprising a recurring unit (A) represented by the following formula and a recurring unit (B) represented by the following formula as the main constituents:

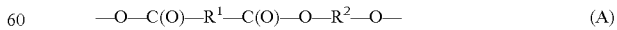

$$—O—C(O)—R^1—C(O)—O—R^2—O— \quad (A)$$

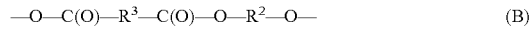

$$—O—C(O)—R^3—C(O)—O—R^2—O— \quad (B)$$

{in the above formulas, $R^1$ is a phenylene group or naphthalenediyl group, $R^2$ is an alkylene group having 2 to 4 carbon atoms or cyclohexanedimethylene group, and $R^3$ is a group represented by the following formula (C):

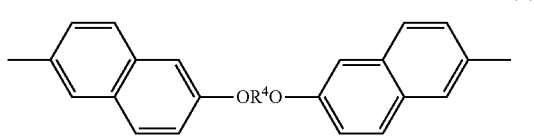

(C)

(in the above formula, $R^4$ is an alkylene group having 2 to 10 carbon atoms)}
wherein the content of the recurring unit (B) is not less than 5 mol % and less than 50 mol %, and the ratio ($C_{A-B}$) of adjacent recurring units (A) and (B) satisfies the following expression (1):

$$(C_{A-B})/2(C_A) \times (C_B) < 0.90 \qquad (1)$$

(in the above expression, ($C_A$) is the molar fraction of the recurring unit (A) in the polyester resin based on the total number of moles of the recurring units (A) and (B), ($C_B$) is the molar fraction of the recurring unit (B) in the polyester resin based on the total number of moles of the recurring units (A) and (B), and ($C_{A-B}$) is the ratio of adjacent recurring units (A) and (B) based on the total number of adjacent recurring units (A) and (A), adjacent recurring units (B) and (B), and adjacent recurring units (A) and (B)).

That is, the polyester resin of the present invention has a recurring unit (B) content of not less than 5 mol % and less than 50 mol % and a ratio of adjacent recurring units (A) and (B) of less than 0.9 based on a value obtained by doubling the product of the contents of the recurring units (A) and (B).

As a preferred example of the polyester resin of the present invention, there is provided a polyester resin, wherein $R^2$ is an ethylene group, wherein the recurring unit (A) is at least one selected from the group consisting of ethylene-2,6-naphthalene dicarboxylate and ethylene terephthalate units or wherein $R^4$ is an ethylene group.

According to another aspect of the present invention, there is provided a biaxially oriented polyester film comprising the above polyester resin of the present invention. As a preferred example of the biaxially oriented polyester film of the present invention, there is provided a biaxially oriented polyester film, wherein the film has a Young's modulus of not less than 6.0 GPa in at least one of the planar directions of the film, the film has the relationship represented by the following expression (2) in at least one of the planar directions of the film:

$$\alpha h < -1.2Y + 17 \qquad (2)$$

(in the above expression (2), αh is a humidity expansion coefficient (ppm/% RH), and Y is a Young's modulus (GPa)), the humidity expansion coefficient in at least one direction of the film is 1 to 7 ppm/RH, the temperature expansion coefficient in at least one direction of the film is not more than 10 ppm/° C., and the film is used as a base film for a magnetic recording medium which is a high-density magnetic recording tape of linear recording system.

Further, according to the present invention, there is also provided a process for producing a polyester resin, comprising the step of melt kneading together a polyester resin A having a recurring unit (A) as the main constituent and a polyester resin B having a recurring unit (B) as the main constituent to ensure that the ratio of the number of moles of the recurring unit (B) becomes not less than 5 mol % and less than 50 mol % based on the total number of moles of the recurring units (A) and (B).

As a preferred example of the process for producing a polyester resin of the present invention, there is also provided a process for producing a polyester resin, wherein the mol % of the recurring unit (B) contained in the polyester resin A and the polyester resin B satisfies the following expression (3):

$$(BC_B) - (AC_B) \geq 10 \qquad (3)$$

(in the expression (3), ($BC_B$) is the mol % of the recurring unit (B) contained in the polyester resin B, and ($AC_B$) is the mol % of the recurring unit (B) contained in the polyester resin A.)

BEST MODE FOR CARRYING OUT THE INVENTION

<Polyester Resin>
In the present invention, the polyester resin comprises the recurring unit (A) and the recurring unit (B) as the main constituents.

The recurring unit (A) is obtained by reacting an aromatic dicarboxylic acid component having a phenylene group or a naphthalenediyl group as $R^1$ with a glycol component having at least one selected from the group consisting of an alkylene group having 2 to 4 carbon atoms and a cyclohexanedimethylene group as $R^2$.

Examples of the aromatic dicarboxylic acid component include terephthalic acid, isophthalic acid, 2,6-naphthalenedicarboxylic acid and 2,7-naphthalenedicarboxylic acid. Terephthalic acid and 2,6-naphthalene dicarboxylic acid are preferred from the viewpoint of mechanical properties. 2,6-naphthalenedicarboxylic acid is particularly preferred. Examples of the glycol component including $R^2$ include ethylene glycol, trimethylene glycol, tetramethylene glycol and cyclohexanedimethanol. Ethylene glycol and cyclohexanedimethanol are preferred from the viewpoint of mechanical properties. Ethylene glycol is particularly preferred.

Preferred examples of the recurring unit (A) include alkylene terephthalates such as ethylene terephthalate, trimethylene terephthalate and butylene terephthalate, and alkylene-2,6-naphthalates such as ethylene-2,6-naphthalate, trimethylene-2,6-naphthalate and butylene-2,6-naphthalate. Out of these, ethylene terephthalate and ethylene-2,6-naphthalate are preferred from the viewpoint of mechanical properties. Ethylene-2,6-naphthalate is particularly preferred. From this point of view, the content of ethylene glycol is preferably not less than 90 mol %, particularly preferably 95 to 100 mol % of the glycol component.

In the recurring unit (B) in the present invention, $R^3$ is represented by the above formula (C). In the formula (C), $R^4$ is an alkylene group having 2 to 10 carbon atoms. Examples of the aromatic dicarboxylic acid component constituting the recurring unit (B) include 6,6'-(ethylenedioxy)di-2-naphthoic acid, 6,6'-(trimethylenedioxy)di-2-naphthoic acid and 6,6'-(butylenedioxy)di-2-naphthoic acid. Out of these, the number of carbon atoms of $R^4$ is preferably even from the viewpoint of the effect of the present invention. 6,6'-(ethylenedioxy)di-2-naphthoic acid is particularly preferred. The glycol component in the recurring unit (B) is preferably the same as that of the recurring unit (A).

The total number of the recurring units (A) and the recurring units (B) is preferably 90 to 100 mol %, more preferably 95 to 100 mol % of the total number of all the recurring units of the polyester resin of the present invention.

The content of the recurring unit (B) in the polyester resin must be not less than 5 mol % and less than 50 mol % based on the total number of moles of the recurring unit (A) and the recurring unit (B). When the content is lower than the lower limit, the effect of reducing the humidity expansion coefficient in the present invention by copolymerization is hardly obtained. When the content of the recurring unit (B) is higher than the upper limit, moldability is apt to be impaired. Surprisingly, the effect of reducing the humidity expansion coefficient by the recurring unit (B) is obtained very efficiently with a small amount of the recurring unit (B). When the content is lower than the above upper limit, specifically less than 50 mol %, the same or lower humidity expansion coefficient than that of the film described in Examples of Patent Document 3 is obtained. It can be said that the effect is saturated from the viewpoint of the humidity expansion coefficient if the recurring unit (B) is added in an amount larger than the upper limit. The upper limit of the content of the recurring unit (B) is preferably 45 mol %, more preferably 40 mol %, much more preferably 35 mol %, particularly preferably 30 mol %, and the lower limit is preferably 5 mol %, more preferably 7 mol %, much more preferably 10 mol %, particularly preferably 15 mol %.

By using a polyester obtained by copolymerizing a specific amount of the 6,6'-(alkylenedioxy)di-2-naphthoic acid component, a molded article, for example, a film having both a low temperature expansion coefficient and a low humidity expansion coefficient can be produced.

The present invention is characterized in that the ratio $(C_{A-B})$ of recurring units (A) and (B) which are bonded to each other side by side satisfies the above expression (1). The denominator in the above expression (1) is the probability that the recurring units (A) and (B) are adjacent to each other. Therefore, when a polycondensation reaction is carried out after an esterification or transesterification reaction between the aromatic dicarboxylic acid components and the glycol components constituting the recurring units (A) and (B), a value close to this value is obtained. Setting this value to the range of the above expression (1) means that the ratio of recurring units (A) and (B) which are bonded to each other side by side is reduced, and the ratio $(C_{A-A})$ of adjacent recurring units (A) and the ratio $(C_{B-B})$ of adjacent recurring units (B) are increased. The present invention is based on the finding that, by setting the value of the above expression (1) to a value lower than the upper limit, elongation can be suppressed when tension is applied at a high temperature as in the time of processing without impairing the effect of improving dimensional stability against environmental changes such as the above temperature expansion coefficient and humidity expansion coefficient.

The polyester resin of the present invention is not obtained simply by carrying out the esterification reaction or transesterification reaction and the polycondensation reaction between the aromatic dicarboxylic acid components and the glycol components constituting the recurring units (A) and (B). For example, the polyester resin can be produced by preparing a polyester resin B comprising the recurring unit (B) as the main constituent and a polyester resin A comprising the recurring unit (A) as the main constituent and melt kneading them together. As a matter of course, since the above ratio becomes close to the above stochastically calculated value when transesterification proceeds completely by melt kneading, care must be taken to carry out melt kneading at a relatively low temperature in a short time as will be described hereinafter. As a matter of course, the polyester resin of the present invention is not limited to the above polyester resin which is produced by melt kneading and may be a polyester resin produced by any process if it satisfies the above expression (1).

The lower limit of the ratio represented by the above expression (1) is not particularly limited and generally tends to become not less than 0.4 as the transesterification reaction proceeds when at least two polyester resins are melt kneaded together. It tends to become not less than 0.6 when the polyester resin A and the polyester resin B are kneaded together closely. The above $(C_A)$ is the molar fraction of the recurring unit (A) based on the total number of moles of the recurring units (A) and (B), $(C_B)$ is the molar fraction of the recurring unit (B) based on the total number of moles of the recurring units (A) and (B), and $(C_{A-B})$ is the ratio of adjacent recurring units (A) and (B) based on the total number of adjacent units (A) and (A), adjacent units (B) and (B), and adjacent units (A) and (B).

The ratio of adjacent recurring units (A) and (A) may be referred to as $(C_{A-A})$, and the ratio of adjacent recurring units (B) and (B) may be referred to as $(C_{B-B})$.

A further detailed description is given of a preferred example of the polyester resin of the present invention.

The polyester resin in the present invention may be obtained by copolymerizing another comonomer known per se as long as the effect of the present invention is not impaired and may be prepared as a composition by blending a polyether imide or a crystalline resin.

The polyester resin of the present invention has an intrinsic viscosity measured at 35° C. by using a mixed solvent of p-chlorophenol and 1,1,2,2-tetrachloroethane (weight ratio of 40/60) of preferably 0.4 to 1.5 dl/g, more preferably 0.5 to 1.3 dl/g.

The melting point measured by DSC of the polyester resin of the present invention is preferably 200 to 260° C., more preferably 215 to 255° C., particularly preferably 225 to 253° C. from the viewpoint of film formability. When the melting point is higher than the above upper limit, fluidity deteriorates and delivery is apt to become nonuniform at the time of molding after the polyester resin is melt extruded. When the melting point is lower than the above lower limit, film formability is high but the mechanical properties of the aromatic polyester are apt to be impaired. That is, the present invention is based on the finding that, though the mechanical properties degrade at the same time when the melting point is reduced by copolymerizing another acid component, surprisingly, mechanical properties equivalent to those of the aromatic polyester to be copolymerized and a polymer comprising an ester of 6,6'-(alkylenedioxy)di-2-naphthoic acid as the main recurring unit as described in Patent Documents 1 to 4 can be obtained probably due to improved film formability.

The polyester resin of the present invention has a glass transition temperature (may be referred to as "Tg" hereinafter) measured by DSC of preferably 90 to 120° C., more preferably 95 to 119° C., particularly preferably 100 to 118° C. from the viewpoints of heat resistance and dimensional stability. The above melting point and the glass transition temperature can be adjusted by controlling the types and amounts of the comonomers and a dialkylene glycol as a by-product.

<Film>

The biaxially oriented polyester film of the present invention is obtained by melting the above polyester resin and extruding it into a sheet form. Since fluidity at the time of melting and crystallinity after that are improved as described above, a film which is uniform in thickness and has excellent film formability is obtained.

Since the film is obtained by melting and forming the above polyester resin, the film has the excellent mechanical properties of the polyalkylene-6,6'-(alkylenedioxy)di-2-naphthoate and the aromatic polyester having the recurring unit (A) to be copolymerized with the above substance. The film obtained by forming the polyester resin of the present invention as it is satisfies the above expression (1) like the polyester resin.

By the way, since the biaxially oriented polyester film of the present invention exhibits excellent dimensional stability when it is used as a base film for a magnetic tape, it preferably has a Young's modulus of not less than 6.0 GPa in at least one of the planar directions of the film. Since it has such a high Young's modulus, even when the polyalkylene-6,6'-(alkylenedioxy)di-2-naphthoate is used as a comonomer, the humidity expansion coefficient can be sufficiently reduced. The upper limit of the Young's modulus is not limited but generally 11 GPa. The Young's modulus is preferably 5.1 to 11 GPa, more preferably 5.2 to 10 GPa, particularly preferably 5.5 to 9 GPa in the longitudinal direction of the film and preferably 5.0 to 11 GPa, more preferably 6 to 10 GPa, particularly preferably 7 to 10 GPa in the transverse direction of the film.

A detailed description is subsequently given of a preferred example of the biaxially oriented polyester film of the present invention.

The humidity expansion coefficient ($\alpha h$) and Young's modulus (Y) of the biaxially oriented polyester film of the present invention preferably satisfy the relationship represented by the following expression (2) in at least one direction, preferably a direction in which the Young's modulus of the film is not less than 6 GPa, particularly preferably the transverse direction of the film.

$$\alpha h < -1.2Y + 17 \quad (2)$$

($\alpha h$ is a humidity expansion coefficient (ppm/% RH), and Y is a Young's modulus (GPa).)

When the obtained biaxially oriented polyester film does not satisfy the relationship of the above expression (2), it has $\alpha h$ for the same Young's modulus as that of a conventional polyethylene terephthalate or polyethylene-2,6-naphthalate film and the effect of reducing humidity expansion by copolymerizing the polyalkylene-6,6'-(alkylenedioxy)di-2-naphthoate is not fully obtained. The coefficient "−1.2" in the above expression (2) is derived from the relationship between the Young's modulus and $\alpha h$ of the polyethylene-2,6-naphthalate film described in Comparative Examples 1 to 3 of this text. The aromatic polyester obtained by copolymerizing 6,6'-(alkylenedioxy)di-2-naphthoic acid is particularly preferably polyethylene-2,6-naphthalate because its Young's modulus is easily made higher. The relationship between the humidity expansion coefficient ($\alpha h$) and the Young's modulus (Y) is preferably $$\alpha h < -1.2Y + 16.5 \quad (2'),$$

more preferably $$\alpha h < -1.2Y + 16.0 \quad (2'').$$

As for the relationship between the Young' modulus and $\alpha h$, the lower limit is not particularly limited but generally satisfies $$\alpha h > -1.2Y + 12.0 \quad (2''').$$

The above Young's modulus, $\alpha h$ and $\alpha t$ which will be described hereinafter can be adjusted by the above-described copolymerization and stretching which will be described hereinafter.

Preferably, the biaxially oriented polyester film of the present invention has a temperature expansion coefficient ($\alpha t$) in at least one direction, preferably the transverse direction of the film of not more than 10 ppm/° C. because it exhibits excellent dimensional stability. When the temperature expansion coefficient in at least one direction of the film is not more than 10 ppm/° C., excellent dimensional stability against environmental changes can be obtained. Although it is expected from the results of Patent Document 3 that the temperature expansion coefficient becomes high when the polyalkylene-6,6'-(alkylenedioxy)di-2-naphthoate is copolymerized, the present invention is based on the finding that, when a specific amount of the above substance is copolymerized and the obtained resin is stretched, surprisingly, the temperature expansion coefficient can be made low. The lower limit of the temperature expansion coefficient is not limited but generally −15 ppm/° C. The temperature expansion coefficient ($\alpha t$) is preferably −10 to 10 ppm/° C., more preferably −7 to 7 ppm/° C., particularly preferably −5 to 5 ppm/° C. because the obtained magnetic recording tape can exhibit excellent dimensional stability against dimensional changes caused by ambient temperature and humidity variations.

Preferably, the biaxially oriented polyester film of the present invention has a humidity expansion coefficient ($\alpha h$) in at least one direction, preferably the transverse direction of the film in which the relationship of the temperature expansion coefficient is satisfied, of 1 to 7 ppm/% RH, preferably 3 to 6 ppm/% RH from the viewpoint of the dimensional stability of the obtained magnetic recording tape. Particularly when the biaxially oriented polyester film is used as a base film for magnetic recording tapes, the above direction is preferably the transverse direction of the biaxially oriented polyester film because a track shift can be completely suppressed.

As for the direction in which the above temperature expansion coefficient is not more than 10 ppm/° C., the above relationship may be satisfied in at least one direction, preferably the transverse direction as described above. However, the same temperature expansion coefficient, humidity expansion coefficient and Young's modulus are preferably satisfied in a direction orthogonal to the above direction as well from the viewpoint of dimensional stability.

<Production Process of Polyester Resin>

A detailed description is subsequently given of the process for producing the polyester resin of the present invention.

First, a polyester precursor is produced by reacting 6,6'-(alkylenedioxy)di-2-naphthoic acid and, for example, 2,6-naphthalenedicarboxylic acid, terephthalic acid or an ester forming derivative thereof with, for example, ethylene glycol. The polyester precursor obtained as described is polymerized in the presence of a polymerization catalyst to produce the polyester resin, and solid-phase polymerization may be carried out as required. What is important at this point is as described above that at least two polyester resins which differ from each other in the contents of the recurring units (A) and (B) in the obtained polyester resin are produced. For example, the polyester resin A having the recurring unit (A) as the main constituent and polyester resin B having the recurring unit (B) as the main constituent are produced.

The difference between the mol % ($AC_B$) of the recurring unit (B) in the polyester resin A and the mol % ($BC_B$) of the recurring unit (B) in the polyester resin B is preferably not less than 10 mol %, more preferably not less than 30 mol %, particularly preferably not less than 50 mol % because the relationship of the above expression (1) is easily satisfied.

The polyester resin B has a recurring unit (B) content of 50 to 100 mol %, preferably 55 to 90 mol %, particularly preferably not less than 58 mol % and less than 80 mol % because it is easily melt kneaded with the polyester resin A and the ratio can be easily set to the range of the above expression (1).

The polyester resin A having a recurring unit (A) content of preferably not less than 60 mol %, more preferably not less than 70 mol %, particularly preferably not less than 80 mol % is favorable because the ratio is easily set to the range of the above expression (1). The upper limit of the content of the recurring unit (A) in the polyester resin A is not particularly limited and may be 100 mol %.

These polyester resins may be melt kneaded together under the condition in which a transesterification reaction does not proceed completely. Stated more specifically, as the melt kneading temperature becomes lower and the melt kneading time becomes shorter, the proceeding of the transesterification reaction can be suppressed more.

The intrinsic viscosity measured at 35° C. in a mixed solvent of p-chlorophenol and 1,1,2,2-tetrachloroethane (weight ratio of 40/60) of the aromatic polyester obtained as described above is preferably 0.4 to 1.5 dl/g, more preferably 0.5 to 1.3 dl/g from the viewpoint of the effect of the present invention.

When the glycol component is ethylene glycol in the step of producing the above polyester precursor, the ethylene glycol component is used in an amount preferably 1.1 to 6 times, more preferably 2 to 5 times, particularly preferably 3 to 5 times the total number of moles of all the acid components from the viewpoint of productivity.

When the glycol component is ethylene glycol, the reaction temperature for producing the polyester precursor is preferably the boiling point of ethylene glycol or higher, particularly preferably 190 to 250° C. When the reaction temperature is lower than 190° C., a reaction hardly proceeds completely and when the reaction temperature is higher than 250° C., a dialkylene glycol as a side reaction product is readily produced. The reaction can be carried out under normal pressure but may be carried out under increased pressure to enhance productivity. More specifically, the reaction pressure is 10 to 200 kPa in terms of absolute pressure, the reaction temperature is generally 150 to 250° C., preferably 180 to 230°, and the reaction time is 10 minutes to 10 hours, preferably 30 minutes to 7 hours. The polyester precursor as a reaction product is obtained by this esterification reaction.

In the reaction step for producing the polyester precursor, a known esterification or transesterification catalyst may be used. The catalyst is selected from an alkali metal compound, an alkali earth metal compound and a titanium compound.

A description is subsequently given of a polycondensation reaction. First, the polycondensation temperature is preferably the melting point or higher of the obtained polymer and 230 to 280° C., more preferably a temperature 5° C. higher than the melting point to a temperature 30° C. higher than the melting point. The polycondensation reaction is preferably carried out under a reduced pressure of 50 Pa or less. When the pressure is higher than 50 Pa, the time required for the polycondensation reaction becomes long and it is difficult to obtain an aromatic copolyester resin having a high degree of polymerization.

The polycondensation catalyst is a metal compound containing at least one metal element. The polycondensation catalyst may be used in the esterification reaction. Examples of the metal element include titanium, germanium, antimony, aluminum, nickel, zinc, tin, cobalt, rhodium, iridium, zirconium, hafnium, lithium, calcium and magnesium. Titanium, germanium, antimony, aluminum and tin are preferred, and a titanium compound is particularly preferred because it has high activity in both the esterification reaction and the polycondensation reaction.

These catalysts may be used alone or in combination. The amount of the catalyst is preferably 0.001 to 0.5 mol %, more preferably 0.005 to 0.2 mol % based on the total number of moles of the recurring units of the aromatic copolyester.

Examples of the titanium compound as the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, an orthoester or condensed orthoester of titanium, a reaction product of an orthoester or condensed orthoester of titanium and hydroxycarboxylic acid, a reaction product of an orthoester or condensed orthoester of titanium, hydroxycarboxylic acid and a phosphorus compound, and a reaction product of a polyhydric alcohol having an orthoester or condensed orthoester of titanium and at least two hydroxyl group, 2-hydroxycarboxylic acid or a base.

The polyester resin of the present invention may be mixed with another thermoplastic polymer, a stabilizer such as a ultraviolet absorbent, an antioxidant, a plasticizer, a lubricant, a flame retardant, a release agent, a pigment, a nucleating agent, a filler or glass fibers, carbon fibers and lamellar silicate as required to prepare a polyester resin composition. Examples of the another thermoplastic polymer include aliphatic polyester-based resins, polyamide-based resins, polycarbonates, ABS resin, polymethyl methacrylate, polyamide-based elastomers, polyester-based elastomers, polyether imides and polyimides.

<Film Production Process>

The biaxially oriented polyester film of the present invention is preferably produced by stretching the film in both the film forming direction and the transverse direction to enhance molecular orientation in these directions. For example, it is preferably produced by the following process because its Young's modulus is easily improved while film formability is retained.

First, the above polyester resin of the present invention, or a polyester resin having a high content of the recurring unit (A) and a polyester resin having a high content of the recurring unit (B) before melt kneading are dried as starting materials, supplied into an extruder heated at a temperature of the melting point (Tm: ° C.) of the polyester resin to (Tm+50)° C. and extruded into a sheet form from a die such as a T die. This extruded sheet product is quenched by a rotating cooling drum to be solidified so as to obtain an unstretched film which is then biaxially stretched. Care must be taken to ensure that the above transesterification reaction does not proceed during melt kneading.

To set the above Young's modulus, $\alpha t$ and $\alpha h$ to preferred ranges, the subsequent stretching step must be carried out smoothly. From this point of view, cooling with the cooling drum is preferably carried out very quickly. From this point of view, it is preferred to carry out this step at a low temperature of 20 to 60° C. and not a high temperature of 80° C. as in Patent Document 3. By carrying out the step at such a low temperature, the crystallization of the unstretched film is suppressed, and the subsequent stretching step can be carried out more smoothly.

Biaxial stretching may be either sequential biaxial stretching or simultaneous biaxial stretching.

A production process in which sequential biaxial stretching is carried out, i.e., the film is stretched in the longitudinal direction and then the transverse direction and heat set in this order will be explained as an example. Preferably, the film is first stretched in the longitudinal direction to 3 to 8 times at a glass transition temperature (Tg: ° C.) of the aromatic copolyester to (Tg+40)° C. and then in the transverse direction to 3 to 10 times at a temperature of (Tg+10) to (Tg+50)° C. which is higher than the temperature for stretching in the longitudinal direction and further heat set at a temperature lower than the melting point of the polymer and (Tg+50) to (Tg+150)° C. for 1 to 20 seconds and further 1 to 15 seconds.

In general, when the draw ratio is increased, film forming stability is impaired. However, since the 6,6'-(alkylenedioxy) di-2-naphthoic acid component is copolymerized in the present invention, stretchability is very high, whereby there is no such problem and the draw ratio can be made higher, which is especially advantageous for the formation of a very thin film having a thickness of 10 μm or less, further 8 μm or less. The lower limit of the thickness of the film is not particularly limited but generally about 1 μm, preferably 3 μm.

Sequential biaxial stretching has been described above. The biaxially oriented polyester film of the present invention can be produced by simultaneous biaxial stretching in which stretching is carried out in both the longitudinal direction and the transverse direction at the same time with reference to the draw ratio and the stretching temperature which have been described above.

The biaxially oriented polyester film of the present invention is not limited to a single-layer film and may be a multi-layer film. In this case, at least one film layer may be the biaxially oriented polyester film of the present invention. Stated more specifically, for example, after two or more molten polyesters are laminated together in a die and extruded into a film form at a temperature of the melting point (Tm: °C.) of each polyester to (Tm+70)° C., or after two or more molten polyesters are extruded from a die and laminated together, the resulting laminate is solidified by quenching to prepare an unstretched laminated film which is then stretched biaxially and heat set in the same manner as the above single-layer film.

A coating layer known per se may be formed on the biaxially oriented polyester film of the present invention to improve adhesion and slipperiness. To form the coating layer, a desired coating composition is applied to one side or both sides of the above unstretched film or a monoaxially oriented film, and stretched biaxially and heat set in the same manner as the above single-layer film.

According to the present invention, there is provided a magnetic recording tape which comprises the above biaxially oriented polyester film of the present invention as a base film, a non-magnetic layer and a magnetic layer formed on one side of the polyester film in this order and a back coat layer on the other side of the polyester film.

EXAMPLES

The following examples and comparative examples are provided to further illustrate the present invention. In the present invention, the characteristic properties of these examples were measured and evaluated by the following methods.

(1) Intrinsic Viscosity

The intrinsic viscosity of the obtained polyester was measured at 35° C. by dissolving the polymer in a mixed solvent of p-chlorophenol and 1,1,2,2-tetrachloroethane (weight ratio of 40/60).

(2) Glass Transition Point and Melting Point

The glass transition point and the melting point were measured by DSC (DSC2920, trade name of TA Instruments Co., Ltd.) with a sample weight of 20 mg at a temperature elevation rate of 10° C./min.

(3) Amounts of Comonomers

As for the glycol component, 10 mg of a sample was dissolved in 0.5 ml of a mixed solvent of p-chlorophenol and 1,1,2,2-tetrachloroethane (volume ratio of 3:1) at 80° C. Isopropylamine was added to the resulting solution and fully mixed with it to measure the amount of the glycol component at 80° C. by 600 MHz $^1$H-NMR (JEOL A600 of Hitachi Denshi, Ltd.).

As for the aromatic dicarboxylic acid component, 50 mg of a sample was dissolved in 0.5 ml of a mixed solvent of p-chlorophenol and 1,1,2,2-tetrachloroethane (3:1) at 140° C. to measure the amount of the acid component at 140° by 100 MHz $^{13}$C-NMR (JEOL A600 of JEOL Ltd.).

(4) Young's Modulus

The obtained film was cut out to obtain a sample having a width of 10 mm and a length of 15 cm, and the sample was pulled at a chuck interval of 100 mm, a tensile rate of 10 mm/min and a chart rate of 500 mm/min with a universal tensile tester (Tensilon, trade name of Toyo Baldwin Co., Ltd.). The Young's modulus was calculated from the tangent of a rising part in the obtained load-elongation curve.

(5) Temperature Expansion Coefficient (αt)

The obtained film was cut out in such a manner that the film forming direction or transverse direction of the film became the measurement direction to obtain a sample having a length of 15 mm and a width of 5 mm, and the sample was set in the TMA 3000 of Shinku Rikou Co., Ltd. to be pretreated in a nitrogen atmosphere (0% RH) at 60° C. for 30 minutes and then cooled to room temperature. Thereafter, the temperature was raised from 25° C. to 70° C. at a rate of 2° C./min, and the sample length at each temperature was measured so as to calculate the temperature expansion coefficient (βt) from the following equation. When the measurement direction was the longitudinal direction of the sample, the measurement was made 5 times to obtain an average value.

$$\alpha t = \{(L_{60}-L_{40})\}/(L_{40} \times \Delta T)\} + 0.5$$

$L_{40}$ in the above equation is a sample length (mm) at 40° C., $L_{60}$ is a sample length (mm) at 60° C., ΔT is 20 (=60-40)° C., and 0.5 is the temperature expansion coefficient (ppm/° C.) of quartz glass.

(6) Humidity Expansion Coefficient (αh)

The obtained film was cut out in such a manner that the film forming direction or transverse direction of the film became the measurement direction to obtain a sample having a length of 15 mm and a width of 5 mm, and the sample was set in the TMA3000 of Shinku Rikou Co., Ltd. to measure its length at humidities of 30% RH and 70% RH in a nitrogen atmosphere at 30° C. so as to calculate its humidity expansion coefficient from the following equation. The measurement direction was the longitudinal direction of the sample, and the measurement was made 5 times to obtain an average value as αh.

$$\alpha h = (L_{70}-L_{30})/(L_{30} \times \Delta H)$$

$L_{30}$ in the above equation is a sample length (mm) at 30% RH, $L_{70}$ is a sample length at 70% RH, and ΔH is 40 (70-30) % RH.

(8) Coating Nonuniformity

A nonmagnetic coating composition and a magnetic coating composition shown below were applied to one side of a film having a width of 500 mm and a length of 500 m with a die coater sequentially in this order to ensure that the thickness of a non-magnetic layer and the thickness of a magnetic layer after drying became 1.2 μm and 0.1 μm, respectively, magnetically oriented and dried. Further, these coating layers were calendered with a small-sized test calender (five sets of steel rolls and nylon rolls) at a temperature of 70° C. and a linear pressure of 200 kg/cm and cured at 70° C. for 48 hours. The coating nonuniformity of the obtained film having a magnetic layer was checked with the eye based on the following criteria. Visual checking was carried out by installing a fluorescent lamp on the rear side of the film and counting light leaks through the magnetic layer. A back coat layer was formed on the film having a magnetic layer as required, and the resulting laminate was slit to a width of 12.65 mm and set in a cassette to obtain a magnetic recording tape.

◎: less than 5 coating failures/250 m²

○; 5 or more coating failures/250 m² and less than 10 coating failures/250 m²
Δ: 10 or more coating failures/250 m² and less than 20 coating failures/250 m²
X: 20 or more coating failures
Composition of Nonmagnetic Coating Composition
titanium dioxide fine particles: 100 parts by weight
Eslec A (vinyl chloride/vinyl acetate copolymer of Sekisui Chemical Co., Ltd.): 10 parts by weight
Nipporan 2304 (polyurethane elastomer of Nippon Polyurethane Co., Ltd.): 10 parts by weight
Colonate L (polyisocyanate of Nippon Polyurethane Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight
Composition of Magnetic Coating Composition
Iron (length: 0.3 μm, needle-like ratio: 10/1, 1800 Orsted): 100 parts by weight
Eslec A (vinyl chloride/vinyl acetate copolymer of Sekisui Chemical Co., Ltd.): 10 parts by weight
Nipporan 2304 (polyurethane elastomer of Nippon Polyurethane Co., Ltd.): 10 parts by weight
Colonate L (polyisocyanate of Nippon Polyurethane Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight
(9) Ratios ($C_{A-A}$), ($C_{B-B}$) and ($C_{A-B}$)
60 mg of the sample was dissolved in a mixed solvent of p-chlorophenol and 1,1,2,2-tetrachloroethane (3:1) at 140° C. After it was confirmed that the sample was completely dissolved in the mixed solvent, it was measured by 150 MHz $^{13}$C-NMR at 140° C. A sample in which the acid component of the recurring unit (A) is bonded to both ends of the glycol component, a sample in which the acid component of the recurring unit (B) is bonded to both ends of the glycol component and a sample in which the acid component of the recurring unit (A) is bonded to one end of the glycol component and the acid component of the recurring unit (B) is bonded to the other end of the glycol component differ from one another in the peak position of the glycol component. Therefore, the ratios ($C_{A-A}$), ($C_{B-B}$) and ($C_{A-B}$) were obtained from the peak area ratios of the glycol component which appeared at detected different positions.
(10) TMA
A film having a width of 4 mm and a length of 20 mm was sampled by using the TMA/SS6000 of Seiko Instruments Co., Ltd. to measure its length ($L_{30}$) at 30° C. and its length ($L_{100}$) at 100° C. under a load of 40 g by increasing the temperature up to 180° C. at a rate of 5° C./min so as to obtain its elongation percentage ($L_{100}$–$L_{30}$)/$L_{30}$(%)). It can be said that as the elongation percentage is lower, dimensional stability is higher.

Reference Example 1

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide and then a polycondensation reaction was carried out to obtain an aromatic polyester (PB1) having an intrinsic viscosity of 0.62 dl/g and comprising 30 mol % of a 2,6-naphthalenedicarboxylic acid component and 70 mol % of a 6,6'-(alkylenedioxy)di-2-naphthoic acid component based on the total of all the acid components and ethylene glycol as the glycol component. Silica particles having an average particle diameter of 0.4 μm were contained in the aromatic polyester in an amount of 0.3 wt % based on the weight of the obtained resin composition before the polycondensation reaction.

Reference Example 2

An esterification reaction and a transesterification reaction among dimethyl 2,6-naphthalene dicarboxylate, 6,6'-(ethylenedioxy)di-2-naphthoic acid and ethylene glycol were carried out in the presence of titanium tetrabutoxide and then a polycondensation reaction was carried out to obtain an aromatic polyester (PA1) having an intrinsic viscosity of 0.62 dl/g and comprising 99.5 mol % of a 2,6-naphthalenedicarboxylic acid component and 0.5 mol % of a 6,6'-(alkylenedioxy)di-2-naphthoic acid component based on the total of all the acid components and ethylene glycol as the glycol component. Silica particles having an average particle diameter of 0.4 μm were contained in the aromatic polyester in an amount of 0.3 wt % based on the weight of the obtained resin composition before the polycondensation reaction.

Reference Example 3

The same operation as in Reference Example 1 was repeated except that the ratio of dimethyl 2,6-naphthalene dicarboxylate and 6,6'-(ethylenedioxy)di-2-naphthoic acid was changed to obtain an aromatic polyester (PA2) having an intrinsic viscosity of 0.62 dl/g and comprising 73 mol % of a 2,6-naphthalenedicarboxylic acid component and 27 mol % of a 6,6'-(alkylenedioxy)di-2-naphthoic acid component based on the total of all the acid components and ethylene glycol as the glycol component. Silica particles having an average particle diameter of 0.4 μm were contained in the aromatic polyester in an amount of 0.3 wt % based on the weight of the obtained resin composition before the polycondensation reaction.

Reference Example 4

The same operation as in Reference Example 1 was repeated except that the ratio of dimethyl 2,6-naphthalene dicarboxylate and 6,6'-(ethylenedioxy)di-2-naphthoic acid was changed to obtain an aromatic polyester (PA3) having an intrinsic viscosity of 0.62 dl/g and comprising 65 mol % of a 2,6-naphthalenedicarboxylic acid component and 35 mol % of a 6,6'-(alkylenedioxy)di-2-naphthoic acid component based on the total of all the acid components and ethylene glycol as the glycol component. Silica particles having an average particle diameter of 0.4 μm were contained in the aromatic polyester in an amount of 0.3 wt % based on the weight of the obtained resin composition before the polycondensation reaction.

Reference Example 5

The same operation as in Reference Example 1 was repeated except that the ratio of dimethyl 2,6-naphthalene dicarboxylate and 6,6'-(ethylenedioxy)di-2-naphthoic acid was changed to obtain an aromatic polyester (PA4) having an intrinsic viscosity of 0.62 dl/g and comprising 90 mol % of a 2,6-naphthalenedicarboxylic acid component and 10 mol % of a 6,6'-(alkylenedioxy)di-2-naphthoic acid component based on the total of all the acid components and ethylene glycol as the glycol component. Silica particles having an average particle diameter of 0.4 μm were contained in the aromatic polyester in an amount of 0.3 wt % based on the weight of the obtained resin composition before the polycondensation reaction.

Reference Example 6

The same operation as in Reference Example 2 was repeated except that 6,6'-(ethylenedioxy)di-2-naphthoic acid was not added to obtain an aromatic polyester (PA5) having an intrinsic viscosity of 0.62 dl/g and comprising a 2,6-naphthalenedicarboxylic acid component as the acid component and ethylene glycol as the glycol component. Silica particles having an average particle diameter of 0.4 μm were contained in the aromatic polyester in an amount of 0.3 wt % based on the weight of the obtained resin composition before the polycondensation reaction.

Example 1

The aromatic polyesters (PA1) and (PB1) obtained in Reference Examples 1 and 2 were fed to an extruder in a weight ratio of 66:34 and extruded into a sheet format 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 135° C. and stretched in the longitudinal direction (film forming direction) at a draw ratio of 5.0 times so as to obtain a monoaxially oriented film. This monoaxially oriented film was guided to a stenter to be stretched in the transverse direction at a temperature of 135° C. and a draw ratio of 8.5 times, heat set (205° C., 10 seconds) and cooled to obtain a biaxially oriented film having a thickness of 4.5

The characteristic properties of the obtained biaxially oriented polyester film and the polyester resin constituting the film are shown in Table 1.

Example 2

The aromatic polyesters (PA1) and (PB1) obtained in Reference Examples 1 and 2 were fed to an extruder in a weight ratio of 52:48 and extruded into a sheet form at 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 130° C. and stretched in the longitudinal direction (film forming direction) at a draw ratio of 5.7 times so as to obtain a monoaxially oriented film. This monoaxially oriented film was guided to a stenter to be stretched in the transverse direction at a temperature of 130° C. and a draw ratio of 8.3 times, heat set (194° C., 10 seconds) and cooled to obtain a biaxially oriented film having a thickness of 5.0 μm.

The characteristic properties of the obtained biaxially oriented polyester film and the polyester resin constituting the film are shown in Table 1.

Example 3

The aromatic polyesters (PA1) and (PB1) obtained in Reference Examples 1 and 2 were fed to an extruder in a weight ratio of 40:60 and extruded into a sheet form at 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 125° C. and stretched in the longitudinal direction (film forming direction) at a draw ratio of 6.2 times so as to obtain a monoaxially oriented film. This monoaxially oriented film was guided to a stenter to be stretched in the transverse direction at a temperature of 125° C. and a draw ratio of 9.5 times, heat set (190° C., 10 seconds) and cooled to obtain a biaxially oriented film having a thickness of 4.5

The characteristic properties of the obtained biaxially oriented polyester film and the polyester resin constituting the film are shown in Table 1.

Example 4

The aromatic polyesters (PA1) and (PB1) obtained in Reference Examples 1 and 2 were fed to an extruder in a weight ratio of 80:20 and extruded into a sheet format 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 138° C. and stretched in the longitudinal direction (film forming direction) at a draw ratio of 4.8 times so as to obtain a monoaxially oriented film. This monoaxially oriented film was guided to a stenter to be stretched in the transverse direction at a temperature of 138° C. and a draw ratio of 8.0 times, heat set (214° C., 10 seconds) and cooled to obtain a biaxially oriented film having a thickness of 4.5

The characteristic properties of the obtained biaxially oriented polyester film and the polyester resin constituting the film are shown in Table 1.

Example 5

The aromatic polyesters (PA1) and (PB1) obtained in Reference Examples 1 and 2 were fed to an extruder in a weight ratio of 66:34 and extruded into a sheet format 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 135° C. and stretched in the longitudinal direction (film forming direction) at a draw ratio of 5.8 times so as to obtain a monoaxially oriented film. This monoaxially oriented film was guided to a stenter to be stretched in the transverse direction at a temperature of 135° C. and a draw ratio of 8.0 times, heat set (205° C., 10 seconds) and cooled to obtain a biaxially oriented film having a thickness of 5.0 μm.

The characteristic properties of the obtained biaxially oriented polyester film and the polyester resin constituting the film are shown in Table 1.

Example 6

The aromatic polyesters (PA1) and (PB1) obtained in Reference Examples 1 and 2 were fed to an extruder in a weight ratio of 61:39 and extruded into a sheet format 295° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 133° C. and stretched in the longitudinal direction (film forming direction) at a draw ratio of 5.0 times so as to obtain a monoaxially oriented film. This monoaxially oriented film was guided to a stenter to be stretched in the transverse direction at a temperature of 135° C. and a draw ratio of 8.3 times, heat set (202° C., 10 seconds) and cooled to obtain a biaxially oriented film having a thickness of 5.0 µm.

The characteristic properties of the obtained biaxially oriented polyester film and the polyester resin constituting the film are shown in Table 1.

Example 7

The same operation as in Example 6 was repeated except that the temperature of the extruder was changed to 300° C. (average residence time: 20 minutes), the draw ratio in the longitudinal direction (film forming direction) was changed to 5.8 times, and the draw ratio in the transverse direction was changed to 8.0 times.

The characteristic properties of the obtained biaxially oriented polyester film and the polyester resin constituting the film are shown in Table 1.

Example 8

The aromatic polyesters (PA1) and (PB1) obtained in Reference Examples 1 and 2 were fed to an extruder in a weight ratio of 72:28 and extruded into a sheet format 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 136° C. and stretched in the longitudinal direction (film forming direction) at a draw ratio of 5.0 times so as to obtain a monoaxially oriented film. This monoaxially oriented film was guided to a stenter to be stretched in the transverse direction at a temperature of 136° C. and a draw ratio of 7.8 times, heat set (209° C., 10 seconds) and cooled to obtain a biaxially oriented film having a thickness of 5.0

The characteristic properties of the obtained biaxially oriented polyester film and the polyester resin constituting the film are shown in Table 1.

Example 9

The same operation as in Example 8 was repeated except that the average residence time in the extruder was changed to 15 minutes, the draw ratio in the longitudinal direction (film forming direction) was changed to 5.2 times and the draw ratio in the transverse direction was changed to 8.0 times.

The characteristic properties of the obtained biaxially oriented polyester film and the polyester resin constituting the film are shown in Table 1.

Example 10

The aromatic polyesters (PA1) and (PB1) obtained in Reference Examples 1 and 2 were fed to an extruder in a weight ratio of 76:24 and extruded into a sheet format 300° C. (average residence time: 15 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 136° C. and stretched in the longitudinal direction (film forming direction) at a draw ratio of 5.2 times so as to obtain a monoaxially oriented film. This monoaxially oriented film was guided to a stenter to be stretched in the transverse direction at a temperature of 138° C. and a draw ratio of 8.2 times, heat set (212° C., 10 seconds) and cooled to obtain a biaxially oriented film having a thickness of 5.0

The characteristic properties of the obtained biaxially oriented polyester film and the polyester resin constituting the film are shown in Table 1.

Example 11

The same operation as in Example 8 was repeated except that the average residence time in the extruder was changed to 20 minutes, the draw ratio in the longitudinal direction (film forming direction) was changed to 4.8 times and the draw ratio in the transverse direction was changed to 8.0 times.

The characteristic properties of the obtained biaxially oriented polyester film and the polyester resin constituting the film are shown in Table 1.

Comparative Example 1

The aromatic polyester (PA2) obtained in Reference Example 3 was fed to an extruder and extruded into a sheet form at 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 130° C. and stretched in the longitudinal direction (film forming direction) at a draw ratio of 6.3 times so as to obtain a monoaxially oriented film. This monoaxially oriented film was guided to a stenter to be stretched in the transverse direction at a temperature of 130° C. and a draw ratio of 9.2 times, heat set (182° C., 10 seconds) and cooled to obtain a biaxially oriented film having a thickness of 5.0 µm.

The characteristic properties of the obtained biaxially oriented polyester film and the polyester resin constituting the film are shown in Table 1.

Comparative Example 2

The aromatic polyester (PA3) obtained in Reference Example 4 was fed to an extruder and extruded into a sheet form at 300° C. (average residence time: 20 minutes) from a die onto a rotating cooling drum having a temperature of 55° C. in a molten state to obtain an unstretched film. This unstretched film was heated between two rollers which differed from each other in revolving speed and were arranged in the film forming direction with an IR heater from above to ensure that the surface temperature of the film became 125° C. and stretched in the longitudinal direction (film forming direction) at a draw ratio of 6.8 times so as to obtain a monoaxially oriented film. This monoaxially oriented film was guided to a stenter to be stretched in the transverse direction at a temperature of 125° C. and a draw ratio of 10.3 times, heat set (175° C., 10 seconds) and cooled to obtain a biaxially oriented film having a thickness of 5.0 μm.

The characteristic properties of the obtained biaxially oriented polyester film and the polyester resin constituting the film are shown in Table 1.

Comparative Example 3

The aromatic polyester (PA4) obtained in Reference Example 5 was fed to an extruder and extruded into a sheet form at 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 138° C. and stretched in the longitudinal direction (film forming direction) at a draw ratio of 4.2 times so as to obtain a monoaxially oriented film. This monoaxially oriented film was guided to a stenter to be stretched in the transverse direction at a temperature of 138° C. and a draw ratio of 7.8 times, heat set (214° C., 10 seconds) and cooled to obtain a biaxially oriented film having a thickness of 4.5 μm.

The characteristic properties of the obtained biaxially oriented polyester film and the polyester resin constituting the film are shown in Table 1.

Comparative Example 4

The aromatic polyester (PA5) obtained in Reference Example 6 itself was used as the polyester resin. PA5 was fed to an extruder as Comparative Example 4-1 and extruded into a sheet form at 300° C. (average residence time: 20 minutes) from a die onto a rotating cooling drum having a temperature of 60° C. in a molten state to obtain an unstretched film. This unstretched film was heated between two sets of rollers which differed from each other in revolving speed and were arranged in the film forming direction with an IR heater from above to ensure that the surface temperature of the film became 140° C. and stretched in the longitudinal direction (film forming direction) at a draw ratio of 3.0 times so as to obtain a monoaxially oriented film. This monoaxially oriented film was guided to a stenter to be stretched in the transverse direction at a temperature of 140° C. and a draw ratio of 4.3 times, heat set (200° C., 10 seconds) and cooled to obtain a biaxially oriented film having a thickness of 4.5 μm.

As Comparative Example 4-2, the same operation as in Comparative Example 4-1 was repeated except that the stretching temperature in the film forming direction was changed to 140° C., the draw ratio in the film forming direction was changed to 4.0 times, the stretching temperature in the transverse direction was changed to 140° C., the draw ratio in the transverse direction was changed to 4.0 times, and the heat setting temperature was changed to 200° C. to obtain a biaxially oriented film.

Further, as Comparative Example 4-3, the same operation as in Comparative Example 4-1 was repeated except that the stretching temperature in the film forming direction was changed to 140° C., the draw ratio in the film forming direction was changed to 4.5 times, the stretching temperature in the transverse direction was changed to 140° C., the draw ratio in the transverse direction was changed to 3.4 times, and the heat setting temperature was changed to 200° C. to obtain a biaxially oriented film. The characteristic properties of the obtained biaxially oriented polyester film are shown in Table 1.

The characteristic properties of the obtained biaxially oriented polyester film and the polyester resin constituting the film are shown in Table 1.

Comparative Example 5

The aromatic polyester (PB1) obtained in Reference Example 1 was fed to an extruder and extruded into a sheet form at 300° C. (average residence time: 20 minutes) from a die onto a rotating cooling drum having a temperature of 55° C. in a molten state to obtain an unstretched film. This unstretched film was heated between two sets of rollers which differed from each other in revolving speed and were arranged in the film forming direction with an IR heater from above to ensure that the surface temperature of the film became 120° C. and stretched in the longitudinal direction (film forming direction) at a draw ratio of 4.5 times so as to obtain a monoaxially oriented film. This monoaxially oriented film was guided to a stenter to be stretched in the transverse direction at a temperature of 120° C. and a draw ratio of 9.0 times, heat set (210° C., 10 seconds) and cooled to obtain a biaxially oriented film having a thickness of 5.0 μm.

The characteristic properties of the obtained biaxially oriented polyester film and the polyester resin constituting the film are shown in Table 1.

TABLE 1

| | Polyester resin | | | | | | Biaxially oriented polyester film | | | | | | |
|---|---|---|---|---|---|---|---|---|---|---|---|---|---|
| | Composition | | | Characteristic properties | | | Young's modulus | | Temperature expansion coefficient | | Humidity expansion coefficient | | Coating non-uniformity | TMA |
| | $C_A$ mol % | $C_B$ mol % | $C_{A-B}/(2C_A * C_B)$ — | Intrinsic viscosity dl/g | Tg °C. | Tm °C. | MD GPa | TD GPa | MD ppm/°C. | TD ppm/°C. | MD ppm/RH % | TD ppm/RH % | — | MD % |
| Ex. 1 | 82 | 18 | 0.80 | 0.56 | 117 | 250 | 5.4 | 10.3 | 9.1 | −4.1 | 8.6 | 5 | ◯ | 1.0 |
| Ex. 2 | 73 | 27 | 0.72 | 0.53 | 116 | 239 | 5.9 | 9.3 | 7.5 | −2.5 | 5.9 | 4 | ◯ | 2.0 |

TABLE 1-continued

|  |  | Polyester resin | | | | | Biaxially oriented polyester film | | | | | | |
|---|---|---|---|---|---|---|---|---|---|---|---|---|---|
|  |  | Composition | | Characteristic properties | | | Young's modulus | | Temperature expansion coefficient | | Humidity expansion coefficient | | Coating non-uniformity | TMA MD % |
|  |  | $C_A$ mol % | $C_B$ mol % | $C_{A-B}/(2C_A*C_B)$ | Intrinsic viscosity dl/g | Tg °C. | Tm °C. | MD GPa | TD GPa | MD ppm/°C. | TD ppm/°C. | MD ppm/RH % | TD ppm/RH % |  |  |
| C. Ex. 1 |  | 73 | 27 | 0.99 | 0.54 | 116 | 227 | 4.9 | 8.8 | 10.6 | −2.1 | 6.6 | 4.2 | X | 3.5 |
| Ex. 3 |  | 65 | 35 | 0.68 | 0.55 | 110 | 235 | 6.2 | 8.8 | 6.6 | −2.2 | 5.7 | 4.2 | Δ | 2.5 |
| C. Ex. 2 |  | 65 | 35 | 0.97 | 0.54 | 110 | 220 | 6.9 | 6.4 | 4.5 | 6.1 | 5.3 | 5.6 | X | 3.5 |
| Ex. 4 |  | 90 | 10 | 0.85 | 0.55 | 118 | 259 | 4.9 | 10.8 | 10.6 | −4.5 | 11.4 | 5.9 | ⊚ | 0.7 |
| Ex. 5 |  | 82 | 18 | 0.88 | 0.52 | 117 | 250 | 6.9 | 8.4 | 4.5 | −1.5 | 7.3 | 6 | ⊚ | 0.9 |
| Ex. 6 |  | 79 | 21 | 0.83 | 0.55 | 116 | 247 | 5.2 | 10.6 | 9.5 | −4.2 | 8.1 | 4.5 | ○ | 1.3 |
| Ex. 7 |  | 79 | 21 | 0.85 | 0.54 | 116 | 247 | 6.1 | 9.2 | 7.3 | −2.0 | 7.3 | 5.2 | ○ | 1.1 |
| Ex. 8 |  | 85 | 15 | 0.87 | 0.52 | 117 | 254 | 5.8 | 9.6 | 8.5 | −3.0 | 9.1 | 6.0 | ⊚ | 0.8 |
| Ex. 9 |  | 85 | 15 | 0.83 | 0.53 | 117 | 254 | 6.0 | 9.4 | 7.0 | −2.8 | 8.9 | 6.1 | ⊚ | 0.9 |
| Ex. 10 |  | 88 | 12 | 0.75 | 0.58 | 118 | 257 | 5.9 | 9.5 | 7.4 | −3.0 | 9.8 | 6.6 | ⊚ | 0.7 |
| Ex. 11 |  | 88 | 12 | 0.78 | 0.56 | 118 | 257 | 5.3 | 9.7 | 9.8 | −3.7 | 10.4 | 6.4 | ⊚ | 0.8 |
| C. Ex. 3 |  | 90 | 10 | 0.95 | 0.55 | 118 | 259 | 3.9 | 10.8 | 13.6 | −4.5 | 12.7 | 5.9 | X | 2.8 |
| C. Ex. 4 | 1 | 100 | 0 | — | 0.55 | 120 | 268 | 5.5 | 9.5 | 14.6 | −3.8 | 13.5 | 8.6 | ⊚ | 0.6 |
|  | 2 |  |  |  |  |  |  | 7.1 | 7.3 | 7.1 | 4.5 | 11.5 | 10.5 | ⊚ | 0.5 |
|  | 3 |  |  |  |  |  |  | 9.2 | 5.7 | −2.0 | 13.5 | 9.2 | 13.5 | ⊚ | 0.4 |
| C. Ex. 5 |  | 30 | 70 | 1.00 | 0.55 | 100 | 268 | 4.4 | 10.8 | 12.1 | −4.5 | 7 | 3.2 | X | 4.3 |

Ex.: Example
C. Ex.: Comparative Example

In Table 1, NA denotes the 2,6-naphthalenedicarboxylic acid component, ENA denotes the 6,6'-(ethylenedioxy)di-2-naphthoic acid component, EG denotes the ethylene glycol component, DEG denotes the diethylene glycol component, Tg is a glass transition temperature, MD is the film forming direction of a film, TD is the transverse direction of the film, and TMA is an elongation percentage measured by TMA.

EFFECT OF THE INVENTION

According to the present invention, there are provided a polyester resin which can improve film formability to a high level while retaining the excellent properties of a polyalkylene-6,6'-(alkylenedioxy)di-2-naphthoate and thereby can provide both excellent dimensional stability against environmental changes such as temperature and humidity and excellent dimensional stability in the processing step which cannot be expected from the prior art to the obtained molded article and a biaxially oriented polyester film comprising the polyester resin.

INDUSTRIAL APPLICABILITY

The biaxially oriented polyester film of the present invention has excellent dimensional stability which cannot be achieved by conventional polyethylene terephthalate, polyethylene-2,6-naphthalate and polyalkylene-6,6'-(alkylenedioxy)di-2-naphthoate and can be advantageously used for applications in which dimensional stability is required, especially as a base film for high-density magnetic recording media.

The invention claimed is:

1. A polyester resin comprising a recurring unit (A) represented by the following formula and a recurring unit (B) represented by the following formula as the main constituents:

$$—O—C(O)—R^1—C(O)—O—R^2—O— \quad (A)$$

$$—O—C(O)—R^3—C(O)—O—R^2—O— \quad (B)$$

{in the above formulas, $R^1$ is a phenylene group or naphthalenediyl group, $R^2$ is an alkylene group having 2 to 4 carbon atoms or cyclohexanedimethylene group, and $R^3$ is a group represented by the following formula (C):

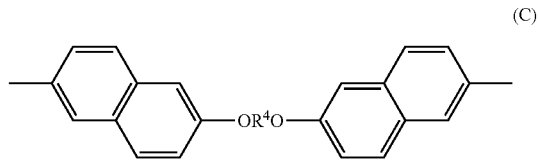

(C)

(in the above formula, $R^4$ is an alkylene group having 2 to 10 carbon atoms)}
wherein
the content of the recurring unit (B) is not less than 5 mol % and less than 50 mol % based on the total number of moles of the recurring unit (A) and the recurring unit (B),
the content of the recurring unit (A) and the recurring unit (B) is 90 to 100 mol % based on the total number of all recurring units of the polyester resin, and
the recurring units (A) and (B) satisfy the following expression (1):

$$(C_{A-B})/2(C_A) \times (C_B) < 0.90 \quad (1)$$

(in the above expression, ($C_A$) is the molar fraction of the recurring unit (A) in the polyester resin based on the total number of moles of the recurring units (A) and (B), ($C_B$) is the molar fraction of the recurring unit (B) in the polyester resin based on the total number of moles of the recurring units (A) and (B), and ($C_{A-B}$) is the ratio of adjacent recurring units (A) and (B) based on the total number of adjacent recurring units (A) and (A), adjacent recurring units (B) and (B), and adjacent recurring units (A) and (B)).

2. The polyester resin according to claim 1, wherein $R^2$ is an ethylene group.

3. The polyester resin according to claim 2, wherein the recurring unit (A) is at least one selected from the group consisting of ethylene-2,6-naphthalene dicarboxylate and ethylene terephthalate units.

4. The polyester resin according to claim 1, wherein $R^4$ is an ethylene group.

5. A biaxially oriented polyester film which comprises the polyester resin of any one of claims 1 to 4.

6. The biaxially oriented polyester film according to claim 5 which has a Young's modulus in at least one of the planar directions of the film of not less than 6.0 GPa.

7. The biaxially oriented polyester film according to claim 5 which has the relationship represented by the following expression (2) in at least one of the planar directions of the film:

$$\alpha h < -1.2Y + 17 \qquad (2)$$

(in the above expression, $\alpha h$ is a humidity expansion coefficient (ppm/% RH) and Y is a Young's modulus (GPa)).

8. The biaxially oriented polyester film according to claim 5, wherein the humidity expansion coefficient ($\alpha h$) in at least one direction of the film is 1 to 7 ppm/% RH.

9. The biaxially oriented polyester film according to claim 5, wherein the temperature expansion coefficient ($\alpha t$) in at least one direction of the film is not more than 10 ppm/° C.

10. The biaxially oriented polyester film according to claim 5 which is used as a base film for a magnetic recording medium.

11. The biaxially oriented polyester film according to claim 10, wherein the magnetic recording medium is a high-density magnetic recording tape of linear recording system.

12. A process for producing the polyester resin of claim 1, comprising the step of melt kneading together a polyester resin A having a recurring unit (A) represented by the following formula as the main constituent and a polyester resin B having a recurring unit (B) represented by the following formula as the main constituent to ensure that the ratio of the number of moles of the recurring unit (B) becomes not less than 5 mol % and less than 50 mol % based on the total number of moles of the recurring units (A) and (B):

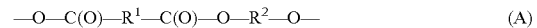

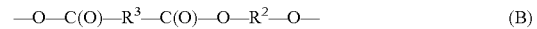

{in the above formulas, $R^1$ is a phenylene group or naphthalenediyl group, $R^2$ is an alkylene group having 2 to 4 carbon atoms or cyclohexylene group, and $R^3$ is a group represented by the following formula (C):

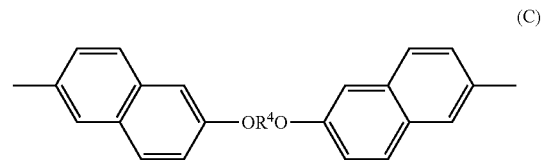

(in the above formula, $R^4$ is an alkylene group having 2 to 10 carbon atoms)}.

13. The process for producing a polyester resin according to claim 12, wherein the mol % of the recurring unit (B) contained in the polyester resin A and the polyester resin B satisfies the following expression (3):

$$(BC_B) - (AC_B) \geq 10 \qquad (3)$$

(in the expression (3), ($BC_B$) is the mol % of the recurring unit (B) contained in the polyester resin B and ($AC_B$) is the mol % of the recurring unit (B) contained in the polyester resin A).

* * * * *